US006846861B2

(12) United States Patent
Herzig et al.

(10) Patent No.: US 6,846,861 B2
(45) Date of Patent: Jan. 25, 2005

(54) PLEASANTLY FRAGRANT PROCESS FOR STABILIZING HALOGEN-CONTAINING POLYMERS

(75) Inventors: Bruce C. Herzig, Morrow, OH (US); Gary M. Conroy, Cincinnati, OH (US); Paul B. Adams, Indian Springs, OH (US); Michael E. Skladani, Strongsville, OH (US); Gene K. Norris, Cincinnati, OH (US)

(73) Assignee: Rohm and Haas Company, Philadelphia, PA (US)

( * ) Notice: Subject to any disclaimer, the term of this patent is extended or adjusted under 35 U.S.C. 154(b) by 0 days.

(21) Appl. No.: 09/968,220

(22) Filed: Sep. 29, 2001

(65) Prior Publication Data

US 2002/0035179 A1 Mar. 21, 2002

Related U.S. Application Data

(63) Continuation-in-part of application No. 09/405,374, filed on Sep. 24, 1999, now abandoned, which is a continuation-in-part of application No. 09/170,416, filed on Oct. 13, 1998, now abandoned.

(51) Int. Cl.$^7$ .............................. C08K 5/00; C08K 5/58
(52) U.S. Cl. ....................... 524/180; 524/178; 524/179; 524/181
(58) Field of Search ................................. 524/178, 179, 524/180, 181

(56) References Cited

U.S. PATENT DOCUMENTS

| 2,870,182 A | 1/1959 | Leistner et al. ........... 260/429.7 |
| 3,979,359 A | 9/1976 | Kugele et al. ......... 260/45.75 S |
| 4,062,881 A | 12/1977 | Kugele ....................... 260/399 |
| 4,104,292 A | 8/1978 | Dworkin et al. ......... 260/429.7 |
| 4,124,618 A | 11/1978 | Dworkin et al. ......... 260/410.6 |
| 4,187,239 A | 2/1980 | Dworkin .................. 260/410.6 |
| 4,360,619 A | 11/1982 | Kugele et al. ............... 524/181 |

FOREIGN PATENT DOCUMENTS

| EP | 0124833 | 11/1984 |

*Primary Examiner*—James J. Seidleck
*Assistant Examiner*—U. K. Rajguru
(74) *Attorney, Agent, or Firm*—Carl P. Hemeway

(57) ABSTRACT

A pleasant fragrance is imparted to the stabilizatiin of a halogen-containing polymer by the use of an organotin mercaptoalkyl heptanoate, and, optionally, up to about 50%, on an equivalents basis, of a sulfide thereof as the stabilizer. A mixture of the heptanoate with up to about 80% by weight of the mixture of a second carboxylate having from 8 to 20 carbon atoms in the carboxylate moiety may be used in place of the heptanoate.

19 Claims, No Drawings

# PLEASANTLY FRAGRANT PROCESS FOR STABILIZING HALOGEN-CONTAINING POLYMERS

This is a Continuation-In-Part of continuation application Ser. No. 09/405,374, filed Sep. 24, 1999 now abandoned, which was a continuation-in-part of Ser. No. 09/170,416, filed Oct. 13, 1998 now abandoned.

FIELD OF THE INVENTION

This invention relates to a pleasantly fragrant method of stabilizing a halogen-containing polymer against heat-induced deterioration through autoxidation at a temperature up to and including that at which it is normally thermally unstable. It relates more particularly to the unexpectedly pleasant, pineapple-like odor of an organotin mercaptide of a mercaptoalkyl heptanoate and of sulfides thereof. It relates still more particularly to a method for imparting a pleasant fragrance to a stabilized halogen-containing polymer at a temperature normally sufficient to cause thermal decomposition.

BACKGROUND OF THE INVENTION

It is well known that halogen-containing polymers are normally susceptible to heat-induced deterioration through autoxidation and that the physical properties of such polymers deteriorate and color changes take place during processing at elevated temperatures. Undesirable color changes often occur within the first 5 to 10 minutes as well as during later stages of the processing. The prime examples of such polymers are the vinyl and vinylidene polymers in which the halogen is attached directly to carbon atoms. Poly(vinyl chloride), copolymers of vinyl chloride and vinyl acetate, and poly(vinylidene chloride), the principal resin in self-clinging transparent food wraps, are the most familiar polymers which require stabilization for their survival during fabrication into pipe, window casings, siding, bottles, wall covering, packaging film, and the like. From a great deal of work in the development of more and more effective heat stabilizers, organotin-based heat stabilizers have become the most efficient and widely used stabilizers for rigid PVC. However, the primary examples of organotin-based heat stabilizers, organotin mercaptides and sulfides thereof, give off an offensive odor even at room temperature and the odor grows worse at the usual processing temperatures.

The offensive odor associated with the use of mercaptans and mercaptides as stabilizers in PVC processing is a long-standing problem. In U.S. Pat. No. 4,062,881, Kugele teaches that sulfides of the organotin mercaptides of mercaptoalkyl carboxylates have reduced odors in comparison with sulfides of the organotin mercaptides of alkyl mercaptocarboxylates, the carboxylic moiety having from 2 to 20 carbon atoms in each case. Dworkin, on the other hand, teaches in U.S. Pat. Nos. 4,104,292; 4,124,618; and 4,187,239 that the organotin mercaptides of mercaptoalkyl octanoate and the sulfides thereof do not exhibit the disagreeable odor which characterizes these classes of organotin compounds.

Now, it has been found, however, that organotin mercaptoalkyl heptanoate and the sulfides thereof not only do not exhibit a disagreeable odor but produce an odor that is actually pleasant—resembling that of pineapples—even when used to stabilize halogen-containing polymers at elevated temperatures. Shorter, less awkward names for the esters and the sulfides—organotin mercaptoalkyl carboxylates and organotin mercaptoalkyl carboxylate sulfides—will be used when appropriate hereinafter.

SUMMARY OF THE INVENTION

It is an object of this invention, therefore, to provide a method for imparting a pleasant, pineapple-like fragrance to a stabilized halogen-containing polymer.

It is a related object of this invention to provide a pleasantly fragrant method for stabilizing a halogen-containing polymer with an organotin mercaptoalkyl carboxylate, an organotin mercaptoalkyl carboxylate sulfide, or mixtures thereof.

These and other objects of this invention which will become apparent from the following description are achieved by mixing the halogen-containing polymer at a temperature up to and including that which is normally sufficient to cause thermal decomposition of the polymer with an organotin stabilizer selected from the group consisting of:

(a) a stabilizer comprising
 (A) from 50 to 100% of an organotin mercaptide of a mercaptoalkyl carboxylate, on an equivalents basis, wherein said carboxylate is selected from the group consisting of a heptanoate and a mixture of a heptanoate with up to about 80% by weight of a second carboxylate having from 8 to 20 carbon atoms in the carboxylic moiety, and
 (B) from 0 to 50% of the mercaptoalkyl carboxylate of (A), on an equivalents basis.
 (C) from 0 to 50% of a sulfide of the organotin mercaptide of (A), on an equivalents basis; and
(b) a stabilizer comprising
 (A) from about 50% to about 99% an organotin mercaptide of a mercaptoalkyl carboxylate having from 14 to 20 carbon atoms in the carboxylic moiety, and
 (B) from about 1% to about 50% of a mercaptoalkyl heptanoate.

DETAILED DESCRIPTION OF THE INVENTION

As used herein, substantially means largely if not wholly that which is specified but so close that the difference is insignificant. Mercaptoalkyl carboxylates are also commonly known as reverse esters with reference to alkyl mercaptocarboxylates. As used herein, an organotin moiety is a mono- or dialkyltin moiety.

The term halogen-containing organic polymers as used herein means halogen-containing polymers or resins in which the halogen is attached directly to the carbon atoms. The halogen-containing polymers which can be stabilized according to this invention include chlorinated polyethylene having 14 to 75%, e.g. 27%, chlorine by weight, chlorinated natural and synthetic rubber, rubber hydrochloride, chlorinated polystyrene, chlorinated polyvinyl chloride, polyvinyl bromide, polyvinyl fluoride, and vinyl chloride polymers. The vinyl chloride polymers known as PVC are made from monomers consisting of vinyl chloride alone or a mixture of monomers comprising, preferably, at least about 70% by weight of vinyl chloride, based on the total monomer weight. Examples of the copolymers include those made from vinyl chloride and from about 1 to about 30% of a copolymerizable ethylenically unsaturated material such as vinyl acetate, vinyl butyrate, vinyl benzoate, vinylidene chloride, diethyl fumarate diethyl maleate, other alkyl fumarates and maleates, vinyl propionate, methyl acrylate, 2-ethylhexyl acrylate, butyl acrylate and other alkyl acrylates, methyl methacrylate, ethyl methacrylate, butyl methacrylate and other alkyl methacrylates, methyl alpha-chloroacrylate, styrene, trichloroethylene, vinyl ketones such as vinyl methyl ketone and vinyl phenyl ketone, 1-fluoro-2-chloroethylene, acrylonitrile, chloroacrylonitrile, allylidene diacetate, chloroallylidene diacetate, and vinyl ethers such as vinyl ethyl ether, vinyl chloroethyl ether, vinyl phenyl ether, and the vinyl ether prepared by the reaction of one mole of acrolein with one mole of ethylene glycol divinyl ether. Typical copolymers include vinyl chloride-vinyl acetate (a 96:4 copolymer being sold commercially as VYNW), vinyl chloride-vinyl acetate (87:13), vinyl chloride-vinyl acetate-maleic anhydride (86:13:1), vinyl chloride-vinylidene chloride (95:5); vinyl chloride-diethyl fumarate (95:5), and vinyl chloride 2-ethylhexyl acrylate (80:20).

A rigid PVC composition does not contain a plasticizer. A semi-rigid PVC composition contains from 1 to about 25 parts of a plasticizer per 100 parts by weight of the halogen-containing vinyl polymer. A flexible PVC composition contains from about 25 to about 100 parts per 100 parts by weight of the halogen-containing vinyl polymer. Alkyl esters of carboxylic acids in which there are from 1 to 3 alkyl groups having from 8 to 12 carbon atoms are representative of the plasticizers. The alkyl group may be n-octyl, 2-ethylhexyl, nonyl, decyl, or dodecyl. Suitable esters include phthalates, trimellitates, benzoates, adipates, glutarates, and sebacates. The plasticizer may also be a pentaerythritol or such an ester thereof. A polymeric plasticizer is also suitable.

Mono-organotin and/or di-organotin mercaptoalkyl carboxylates useful as stabilizers for improving the resistance to deterioration of halogen-containing polymers when heated to 350° F. (about 177° C.) may be made by several different methods such as those taught in U.S. Pat. No. 2,870,182 and U.S. Pat. No. 4,104,292, both of which are hereby incorporated herein by reference for their teachings of such methods. The mono-organotin and/or di-organotin mercaptoalkyl carboxylate monosulfides and/or polysulfides useful as stabilizers for improving the resistance to deterioration of halogen-containing polymers when heated to 350° F. (about 177° C.) may be made by several different methods such as those taught in U.S. Pat. No. 3,869,487; U.S. Pat. No. 4,120,845; U.S. Pat. No. 4,124,618; and U.S. Pat. No. 4,187,239; each of which is hereby incorporated herein by reference for their teachings of such methods.

One method for making the organotin mercaptoalkyl carboxylates comprises formation of the ester by the acid catalyzed condensation of the respective mercaptoalkanol and a carboxylic acid, followed by the reaction of the ester with an organotin oxide or halide. The organotin halide is usually a mixture of mono- and di-alkyltin halides; the level of tri-alkyltin halide being less than 0.5% by weight. In U.S. Pat. No. 4,104,292, the mercaptoalkanol is reacted with a di-organotin oxide or an organostannoic acid in water at about 70° C. before being esterified with the carboxylic acid.

A method for making a mixture of the mono-alkyltin and/or di-alkyltin mercaptoalkyl carboxylates and monosulfides and/or polysulfides thereof, hereinafter called Procedure A, comprises heating stoichiometric quantities of the mercaptoalkyl carboxylate and an alkyltin halide having the formula:

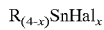   FORMULA I wherein the R groups are independently alkyl groups having from 1 to 12 carbon atoms, Hal is a halogen having an atomic weight of from 35 to 127, preferably chlorine, and x is any number from 2 to 3;

in water and ammonium hydroxide to about 30° C. (86° F.), slowly adding an alkali metal mono- or polysulfide, and heating the reaction mixture further to about 45° C. before separating the product from said mixture. A mixture of halides wherein x is 2 and 3 may be used. The amount chef of sulfide formed will, of course, depend on the amount of alkali metal mono- or polysulfide used. The maximum amount used for the purposes of this invention is 50% of the number of equivalents of non-alkylated tin in the organotin halide used, as expressed by (4-x). Preferably, that amount will be from about 15 to about 50% and, more preferably, from about 35 to about 45%.

In Procedure B, as taught in U.S. Pat. No. 4,124,618 and U.S. Pat. No. 4,187,239, the organotin hydroxyhalide obtained from the reaction of the organotin halide with an alkali metal hydroxide in aqueous solution is then reacted with a mercaptoalkanol and the resulting organotin mercaptide is reacted with an alkali metal sulfide; the resulting sulfide of an organotin mercaptide of a mercaptoalkanol is esterified with a carboxylic acid to obtain the desired organotin compound. Here, the controlling factor in making the desired stabilizer for the purposes of this invention is again the amount of alkali metal sulfide used Alternatively, the sulfide may be made by mixing a monoalkyl- or dialkyltin sulfide with an organotin mercaptide of the mercaptoalkyl carboxylate.

The organotin mercaptoalkyl carboxylate sulfides of this invention are characterized by an equilibrium mixture of:
(1) one or more of the alkyltin halides of FORMULA I;
(2) one or more of the organotin mercaptoalkyl carboxylates of FORMULA II(a):

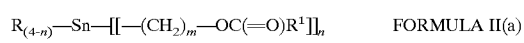   FORMULA II(a)

wherein R is the same as in Formula I; $R^1$ is an alkyl radical having 6 carbon atoms; m is 2 or 3, and n is from 2 to 3; and, optionally;
(3) one or more of the second organotin mercaptoalkyl carboxylates, which have the Formula II(b):

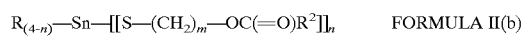   FORMULA II(b)

wherein R, m and n are the same as in Formula II(a) and $R^2$ is an alkyl group having from 7 to 19 carbon atoms;
(4) one or more alkyltin mono- or polysulfides of the carboxylates of (2), alone, or of a mixture of the carboxylates of (2) and (3), including oligomers; and
(5) alkyltin mono- and polysulfides having the FORMULA III, which is representative of linear structures as well as of cyclic trimers and adamantyl rings:

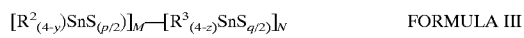   FORMULA III wherein $R^2$ and $R^3$ are independently alkyl radicals having from 1 to 12 carbon atoms and are bonded to Sn; y is 2 or 3; z is 2 or 3; p and q are 2 to 20, preferably 2–4; and M and N are 0–10, preferably 0–4, but M≠N=0; with the proviso that when (4-y)=(4-z), p=q, and when (4-y)≠(4-z), p≠q.

It should be understood that the structures of the sulfides produced by the processes mentioned above are very complex. The reactions are believed to produce an equilibrium mixture composed of several different but related products. As will be appreciated by those of ordinary skill in chemistry, equilibrium mixtures inherently include the starting materials as well as the products of any reaction between them. The chemical and patent literature contain numerous examples demonstrating that members of different classes of organotin compounds may react with one another under certain conditions to yield products containing one or more tin atoms wherein at least a portion of the tin atoms are bonded to different combinations of radicals than they were before being mixed together. Accordingly, the sulfides are believed to include bis[alkyltin)-bis(thioalkyl carboxylate)] monosulfides and polysulfides, bis[(dialkyltin)-mono (thioalkyl carboxylate)]monosulfides and polysulfides, and products which arise during equilibrium reactions among said mono- and polysulfides, including monoalkyltin tris (thioalkyl carboxylates), dialkyltin bis(thioalkyl carboxylates), mono- and di-alkyltin mono- and polysulfides, and oligomers thereof, as well as the starting materials themselves.

As was said above, the amount of sulfide formed will depend on the ratio of the amount of alkali metal mono- or polysulfide to the amount of non-alkylated tin (i.e., 4-x) in the alkyl halide used. For the purpose of calculating the number of equivalents of available tin, the value of (4-n) is equal to (4-x).

Examples of the alkyl groups attached to tin, as represented by R, include methyl, ethyl, propyl, isopropyl, n-butyl, isobutyl, sec-butyl, t-butyl, amyl, hexyl, octyl, isooctyl, 2-ethylhexyl, decyl, dodecyl, and octadecyl. Thus, as starting materials, methyltin trichloride, methyitin tribromide, dimethyltin dichloride, dimethyltin dibromide, ethyltin trichioride, diethyltin dichloride, dipropyltin dichloride, butyltin trichloride, dibutyltin dichloride, sec-butyltin trichloride, octyltin trichloride, dioctyltin dichloride, butyl methyl tin dichloride, 2-ethylhexyl trichloride, di-(2-ethylhexyl) dichloride, and mixtures of the above with each other and with other alkyltin halides may be used.

When Procedure A is used, it is preferred to use mercaptoethyl heptanoate, also called mercaptoethyl enanthate. as the sole carboxylate intermediate for the purposes of this invention although the mercaptopropyl heptanoate is suitable.

The amount of the second carboxylate in the mixed stabilizer may be from about 20 to about 75% of the total weight. As a matter of economics, however, a 50:50 mixture is preferred. The mixed carboxylate moiety may be provided by simply mixing a heptanoate with a second carboxylate or by the esterification of the mercaptoalkanol with a mixture of heptanoic acid and one or more other carboxylic acids having from 8 to 20 carbon atoms. Examples of such other carboxylic acids include octanoic (or caprylic) acid, nonanoic (or pelargonic) acid, decanoic acid, undecanoic acid, lauric acid, myristic acid, palmitic acid, 2-ethylhexanoic acid, stearic acid, oleic acid, linoleic acid, linolenic acid, tall oil acid, and mixtures of all the above. A simple physical mixture of a mercaptoalkyl heptanoate sulfide with a second mercaptoalkyl carboxylate sulfide may be used also when it is desired that the mercaptide moiety comprises different carboxylate moieties.

The organotin mercaptoalkyl carboxylates and sulfides thereof are normally used as stabilizers in this invention in amounts ranging from about 0.01 to about 10%, preferably from about 0.2 to about 5%, by weight of the polymer. For use as stabilizers for rigid and semi-rigid PVC resins and the like, the weight ratio of mono-organotin compounds to di-organotin compounds ranges from 96:4 to 10:90, usually from about 90:10 to about 20:80. The organotin mercaptoalkyl carboxylate sulfides of this invention provide excellent stabilization for clear rigid PVC articles when the the weight ratio of mono-organotin compounds to di-organotin compounds is from about 10:90 to about 50:50.

As another embodiment of this invention, it has been found that the mercaptoalkyl carboxylate esters, themselves, also form synergistic mixtures with the mercaptides and/or sulfides that impart a pleasant fragrance chile stabilizing halogen-containing polymers at elevated processing temperatures. As stated above, the carboxylate moiety is selected from the group consisting of a heptanoate and a mixture of a heptanoate with up to about 80% by weight of a second carboxylate having from 8 to 20 carbon atoms in the carboxylic moiety, Although the amount of the ester may be as much as 50% of the stabilizer on an equivalents basis, as mentioned above, the preferred amount of the ester is from about 10% to about 25% on that same basis. A preferred stabilizer of this invention comprises an organotin mercaptide of a mercaptoalkyl tallate and from about 10% to about 25% of a mercaptoalkyl heptanoate. The weight ratios of mono- and diorganotin compounds recited above for the semi-rigid and flexible PVC's remain valid in this embodiment of the invention. The mixed mono-methylidimethyltin mercaptide of mercaptoethyl tallate is a particularly preferred component of the stabilizer (b) recited above.

Conventional non-metallic stabilizers and antioxidants can also be included in the polymer compositions of the present invention. Thus, there can be included 0.01–0.75%, based on the weight of the polymer, of sulfur containing compounds such as dilauryl-thiodipropionate, distearyl 3,3'-thiodipropionate, dicyclohexyl-3,3-thiodipropionate, dioleyl-3,3'-thiodipropionate, dibenzyl-3,3'-thiodipropionate, didecyl-3,3'-thioipropionate, dibenzyl-3, 3'-thiodipropionate, diethyl-3,3'-thiopropionate, lauryl ester of 3-methylmercaptopropionic acid, lauryl ester of 3-butylmercaptopropionic acid, lauryl ester of 3-lauryl mercaptopropionic acid, and phenyl ester of 3-octyl mercaptopropionic acid.

In addition to the stabilizer compositions of this invention, the polymer compositions of this invention may contain plasticizers, as mentioned above in regard to flexible PVC, and conventional additives such as pigments, fillers, blowing agents, dyes, ultraviolet light absorbing agents, antioxidants, densifying agents, biocides, and the like.

An antioxidant may be added in an amount of 0.01–10%, preferably 0.1–5% by weight of the halogen-containing polymer. Phenolic antioxidants are particularly suitable and are exemplified by 2,6di-t-butyl-p-cresol, butylated hydroxyanisole, propyl gallate, 4,4'-thiobis(6-t-butyl-m-cresol), 4,4'-cyclohexylidene diphenol, 2,5-di-t-amyl hydroquinone, 4,4'-butylidene bis(6-t-butyl-m-cresol), hydroquinone monobenzyl ether, 2,2'-methylene-bis(4-methyl-6-t-butyl phenol), 2,6-butyl-4-decyloxy phenol, 2-t-butyl4-dodecyloxy phenol, 2-t-butyl-4-dodecyloxy phenol, 2-t-butyloctdecyloxy phenol, 4,4'-methylene-bis(2,6-di-t-butyl phenol), p-amino phenol, N-lauryloxy-p-amino phenol, 4,4'-thiobis(3-methyl-6-t-butyl phenol), bis [o-(1,1,3,3-tetramethyl butyl)phenol] sulfide, 4-acetyl-β-resorcylic acid, A-stage p-t-butylphenolformaldehyde resin, 4-dodecyloxy-2-hydroxybenzophenone, 3-hydroxy-4-phenylcarbonyl)phenyl palmitate, en-dodecyl ester of 3-hydroxy-4-(phenyl carbonyl)phenoxyacetic acid, and t-butyl phenol.

From 0.01–30% by weight of an epoxy compound, based on the weight of the vinyl chloride polymer in the PVC compositions of this invention may also be used. Examples of such epoxy compounds include epoxidized soya bean oil, epoxidized lard oil, epoxidized olive oil, epoxidized linseed oil, epoxidized castor oil, epoxidized peanut oil, epoxidized corn oil, epoxidized tung oil, epoxidized cottonseed oil, epichlorhydrin/bis-phenol A resins, phenoxy-propylene oxide, butoxypropylene oxide, epoxidized neopentylene oleate, glycidyl epoxystearate, epoxidized a-olefins, epoxidized glycidyl soyate, dicyclopentadiene dioxide, epoxidized butyl toluate, styrene oxide, dipentene dioxide, glycidol, vinyl cyclo-hexene dioxide, glycidyl ether of resorcinol, glycidol ether of hydroquinone, glycidyl ether of 1,5-dihyroxynaphthalene, epoxidized linseed oil fatty acids, allyl glycidyl ether, butyl glycidyl ether, cyclohexane oxide, 4-(2,3-epoxypropoxy) acetophenone, mesityl oxide epoxide, 2-ethyl-3-propyl glycidamide, glycidyl ethers of glycerine, pentaerritol and sorbitol, and 3,4-epoxycyclohexane-1,1-dimethanol bis-9,10-epoxystearate.

Likewise there can be used organic phosphites in an amount of 0.01 to 10%, preferably 0.1–5% by weight of the vinyl chloride polymer. The organic phosphites contain one or more, up to a total of three, aryl, alkyl, aralkyl and alkaryl groups, in any combination. The term "trialkylaryl" is inclusive of alkyl, aryl, alkaryl and aralkyl phosphites containing any assortment of alkyl, aryl, alkaryl and aralkyl groups. Exemplary are triphenyl phosphite, tricresyl phosphite, tri(dinethylphenyl) phosphite, tributyl phosphite, trioctyl phosphite, tridodecyl phosphite, octyl diphenyl phosphite, dioctyl phenyl phosphite, tri(octyl-phenyl) phosphite, tri(nonylphenyl) phosphite, tribenzyl phosphite, butyl dicresyl phosphite, octyl di(octyl-phenyl) phosphite, tri(2-ethyl-hexyl) phosphite, tritolyl phosphite, tri(2-cyclohexylphenyl) phosphite, tri-alpha-naphthyl phosphite, triphenylphenyl) phosphite, and tri(2-phenylethyl) phosphite.

Likewise there can be included from 0.01–10% by weight of the vinyl chloride polymer of a polyol stabilizer for vinyl chloride resins. Thus there can be included glycerol, sorbitol, pentaeytritol, mannitol and polyethers such as diethylene glycol triethylene glycol, tetraethylene glycol tripropylene glycol, and the like.

Nitrogen containing stabilizers such as dicyandiamide, mel-amine, urea, formoguanamine, dimethyl hydantoin, guanidine, thio-urea, 2-phenylindoles, aminocrotonates, N-substituted maleimides, uracil, the 1,3-dialkyl-6-amino-uracil derivatives described in German Offenlegungsschrift 19,741,778 by Ciba Specialty Chemicals Holding Inc., and the pyrrolodiazine diones described in published Australian Patent Application No. AU-A48232/96 by Cia-Geigy, and the like also can be included in amounts of0.1–10% by weight. Of particular interest are the pyrrolodiazine diones described by the formula:

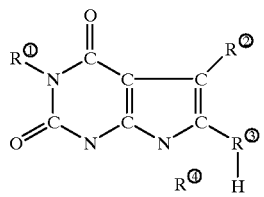

wherein $R^{①}$, $R^{②}$, $R^{③}$, and $R^{④}$ are independently hydrogen or $C_1$–$C_4$ alkyl. Examples of compounds contemplated for use in this invention include the 1H-pyrrolo[2,3-d]pyrimidine-2,4(3H,7H)-diones exemplified by Compound Nos. 103, 111, 123, 129, and 131 of said Australian Patent Application, which have the following substituents:

No. 103 1,3,6-trimethyl;
No. 111 1,3,6,7-tetramethyl;
No. 123 none;
No. 129 1,3-diethyl,6-methyl;
No. 131 1,3-di-n-butyl,6-methyl;

Said compounds may be prepared by the method described by S. Senda and K. Hirota, Chem. Pharm. Bull. 22(7), 1459–1467(1974) or by the reaction of the corresponding aminouracil with molar excesses of chloroacetaldehyde and ammonium acetate in water at about 65° C. until a precipitate forms or with molar excesses of acetoxyacetone and ammonium acetate in water at reflux for 12 hours. The German Offenlegungsschrift 19,741,778 and the Australian Patent Application No. AU-A48232/96 are each incorporated herein by reference.

Conventional lubricants for vinyl chloride resins such as low molecular weight polyethylene, ie. polyethylene wax, fatty acid amides, e.g. lauramide and stearamide, bisamides, e.g. decamethylene, bis amide, and fatty acid esters, e.g. butyl stearate, glyceryl stearate, linseed oil, palm oil, decyloleate, corn oil, cottonseed oil, hydrogenated cottonseed oil, stearic acid, calcium stearate, mineral oil, montan wax, oxidized polyethylene and the like can also be included.

The stabilizers of this invention, as well as the non-metallic stabilizers, anti-oxidants, conventional additives such as pigments, fillers, blowing agents, dyes, ultraviolet light absorbing agents, lubricants, densifying agents, and the like, are incorporated into the polymer compositions in an appropriate mill or mixer or by any other of the well-known methods which provide for uniform distribution throughout the polymer composition.

The following examples further illustrate the preparation of the organotin mercaptoalkyl carboxylate sulfides of this invention, the preparation of stabilized compositions of this invention, and the advantages of providing a pleasant, pineapple-like fragrance to the process of stabilizing halogen-containing compositions at elevated temperatures. All parts are by weight unless otherwise specified.

EXAMPLE 1

A mixture of 1301.9 grams (10 moles) of heptanoic acid, 1328.3 grams (17 moles) of 2-mercaptoethanol and 13.02 grams of ptoluene sulfonic acid was held at 100° C. in a 5-liter, 3-necked round bottom flask equipped with a magnetic sing bar as the pressure was reduced gradually over a period of4.5 hours to 50 mm Hg. The temperature was raised to 125° C. and the pressure was reduced to less than 10 mm Hg for 0.5 hour and then the product was distilled at 125°, less than 10 mm Hg to obtain an ester having a mercapto sulfur content of 17.38%. Theoretical value for 2-mercaptoethyl heptanoate: 17.38%.

A mixture of 539.19 grams (a 2% excess; 2.83 equivalents) of the product and 1010 grams of water is cooled and stirred as 227 grams of concentrated ammonium hydroxide and 212.12 grams (2.27 equivalents) of a 30% by weight solution of sodium hydrosulfide are added at a temperature below 20° C. A mixture of organotin chlorides containing 20.35% mono-methyltin trichloride and 79.65% di-methyltin dichloride (% total chlorine=17.11) and weighing 1046.62 grams (5.05 equivalents) is added while keeping the temperature below 25° C. and the pH is adjusted to 8.0 with ammonium hydroxide after the addition is complete. The liquid separates upon standing and the lower, organic layer is stripped at 100° C. and 10 mm Hg to yield the desired mixture of organotin mercaptoheptanoate and organotin mercaptoheptanoate sulfide wherein the organotin moiety comprises about 20% monomethyl-, 80% dimethyl-tin and the ratio of sulfided heptanoate to un-sulfided heptanoate is 45:55.

EXAMPLE 2 AND COMPARATIVE EXAMPLE 1

In this example, the excellent early color hold of the product of Example 1 is compared with the color holding ability of an alkyltin thioglycolate having a similar ratio of monomethyl- and dimethyltin moieties.

A clear rigid PVC composition containing:

| INGREDIENT | AMOUNT |
|---|---|
| PVC resin (Borden BCP-59) | 100.0 parts |
| B-22 (a modifier) | 6.0 parts |
| K-120 (processing aid) | 1.5 parts |
| Lubricant | 1.7 parts |
| Oxidized polyethylene | 0.2 parts |
| Epoxidized soybean oil | 1.0 parts |
| Product of Example 1 | 0.8 parts | was processed on a standard horizontal two-roll mill (roll speeds 30R/40R) at 350° F. with chips taken at one minute intervals to a maximum of 12 minutes. The formulation of Comparative Example 1 is the same except for the replacement of the Product of Example 1 by an alkyltin thioglycolate NORTON TM-181). The color properties of the chips were measured using a Hunter Labs Colorimeter (L, a, b) and the total energy index (dE) was selected as the measurement for comparison in Table I.

TABLE I

| | PVC Color Hold (dE) Minutes | | | | | | | | | | | |
|---|---|---|---|---|---|---|---|---|---|---|---|---|
| Ex. | 1 | 2 | 3 | 4 | 5 | 6 | 7 | 8 | 9 | 10 | 11 | 12 |
| C.E. 1 | 28.9 | 30.3 | 31.7 | 32.6 | 32.4 | 33.4 | 33.5 | 35.2 | 36.0 | 37.1 | 39.1 | 40.7 |
| 1 | 28.8 | 28.5 | 29.0 | 29.3 | 29.2 | 30.5 | 31.4 | 32.9 | 34.4 | 37.7 | 43.2 | 47.2 |

EXAMPLE 3

To a stirred mixture of 218.70 grams (a 2% excess; 1.06 equivalents) of mercaptoethyl a heptanoate (made by the general procedure of Example 1), 350 grams of water, 20 grams of isopropyl alcohol, and 77.47 grams (0.83 equivalent) of a 30% by weight aqueous solution of isodium hydrosulfide at a temperature below 40° C. there was added 89.55 grams of concentrated ammonium hydroxide and 345.72 grams (1.89 eq) of an aqueous organotin chloride solution containing 88.8% mono-methyltin trichloride and 11.2% di-methyltin dichloride (% total chlorine=19.38) at a pH of 7.2. After 20 minutes the liquid was separated and the lower, organic layer was stripped at 100° C. at less than 5 mm Hg and filtered to yield 304.9 grams of the desired mixture of organotin mercaptoheptanoate and organotin mercaptoheptanoate sulfide wherein the ratio of sulfided heptanoate to un-sulfided heptanoate is 45:55.

EXAMPLE 4

Preparation of Organotin Mercaptoalkyl Nonanoate and Sulfide thereof

Mercaptoethyl nonanoate was made according to the general procedure used in Example 1 to make the heptanoate and it was sulfided according to the general procedure of Example 3 except for the use of 73.11 grams (0.28 eq) of the nonanoate, 100 grams of water, 21.00 grams (0.23 eq) of sodium hydrosulfide, 22.48 grams of ammonium hydroxide, and 105.21 grams (0.50 eq) of an organotin chloride containing 20.71% mono-methyltin trichloride and 79.29% di-methyltin dichloride (% total chlorine=16.85). The ratio of sulfided nonanoate to un-sulfided nonanoate is 45:55.

EXAMPLE 5

Preparation of Organotin Mercaptoalkyl Undecanoate and Sulfide thereof

Mercaptoethyl undecanoate was made according to the general procedure used in Example 1 to make the heptanoate and it was sulfided according to the general procedure of Example 3 except for the use of 71.31 grams (0.28 eq) of the undecanoate, 100 grams of water, 21.00 grams (0.23 eq) of sodium hydrosulfide, 22.48 grams of ammonium hydroxide, and 105.21 grams (0.50 eq) of an organotin chloride containing 20.71% mono-methyltin trichloride and 79.29% di-methyltin dichloride (% total chlorine=16.85). The ratio of sulfided undecanoate to un-sulfided undecanoate is 45:55.

EXAMPLE 6

Preparation of Organotin Mercaptoalkyl Octanoate and Sulfide thereof

To a stirred mixture of 87.0 grams (0.4 equivalent) of mercaptoethyl octanoate (made by the general procedure of Example 1), 175 grams of water, 10.5 grams of isopropyl alcohol, and 0.7 gram of sodium EDTA there was added 29.4 grams (0.31 equivalent) of a 30% by weight aqueous solution of sodium hydrosulfide and 32.9 grams of concentrated ammonium hydroxide. Then, 144.3 grams (0.70 eq) of an organotin chloride containing 21% mono-methyltin Atrichloride and 79% di-methyltin dichloride (% total chlorine=17.20) at a pH of 7–8. After 30 minutes the liquid was separated and the lower, organic layer was stripped at 100° C. at less than 15 mm Hg and filtered. The ratio of sulfided octanoate to un-sulfided octanoate is 43:57.

The most pleasant odor is given a character rating of 1 whereas the strongest odor is given a strength rating of 10. The identity of the stabilizer (i.e., the particular carboxylate present in the sulfide) in each test composition and the parts of stabilizer per hundred parts of resin (phr) are also given in Table II. The stabilizers were evaluated at equal levels of tin.

| INGREDIENT | AMOUNT |
|---|---|
| PVC resin | 100.0 parts |
| Lubricant 1 | 1.0 part |
| Lubricant 2 | 0.2 part |
| Oxidized polyethylene | 0.2 part |
| Epoxidized soybean oil | 1.0 part |
| Stabilizer as in Table II | |

TABLE II

| Example | Carboxylate | phr | Strength | Character |
|---|---|---|---|---|
| 7 | Heptanoate of Ex 1 | 0.82 | 6.2 | 2.0 |
| C.E. 2 | Nonanoate | 0.96 | 4.4 | 2.6 |
| C.E. 3 | Undecanoate | 0.91 | 6.2 | 4.2 |
| C.E. 4 | Tallate* | 1.2 | 7.2 | 6.0 |

*From tall oil acid, a mixture of carboxylic acids - primarily oleic and linoleic acids.

Four of the five panelists rated the stabilizer with the heptanoate ligand as having the most favorable odor. The other panelist could not detect any difference between stabilizers having the heptanoate, nonanoate, and undecanoate ligands.

EXAMPLE 8 AND COMPARATIVE EXAMPLE 5–8

The strength and the character of the odor emanating from the liquid organotin mercaptoethyl carboxylate sulfide stabilizers identified in Table III by the carboxylate present were judged by a panel of 6 people who did not know the specific identity of the samples. The average ratings on a scale of 1–10 are given in Table III wherein a strength rating of 10 is given to the strongest odor and a character rating of 1 is given to the most pleasant odor.

TABLE III

| Example | Stabilizer | Strength | Character |
|---|---|---|---|
| 8 | Product of Example 3 (Heptanoate) | 6.0 | 3.5 |
| C.E. 5 | 50% (Hept)/50% (Tallate) | 4.7 | 4.0 |
| C.E. 6 | 50% (Hept)/50% Octanoate | 4.5 | 3.3 |
| C.E. 7 | 80% (Hept)/20% Octanoate | 3.2 | 3.0 |
| C.E. 8 | Tallate | 6.5 | 6.7 |

These results show that the intense odor of the process using a heptanoate sulfide may be diluted by blending said sulfide with other carboxylate sulfides while retaining a pleasant odor.

EXAMPLES 9–13

The character of the odor emanating from the liquid organotin mercaptoethyl carboxylate sulfide stabilizers identified in Table IV by the carboxylate present of the stabilizers was judged by a panel composed of 22 non-technical who did not know the identity of the stabilizers. They were asked whether they preferred the odor of Stabilizer A or Stabilizer B in each example. The results are given in Table IV.

TABLE IV

| Example | Stabilizer A | Stabilizer B | Preferred A | Preferred B | No Preference |
|---|---|---|---|---|---|
| 9 | Heptanoate | Octanoate | 10 | 6 | 6 |
| 10 | Heptanoate | Tallate | 17 | 3 | 2 |
| 11 | 25% Hept/75% Oct | Octanoate | 13 | 7 | 2 |
| 12 | 25% Hept/75% Oct | Tallate | 19 | 2 | 1 |
| 13 | 50% Hept/50% Tall | Tallate | 18 | 4 | 0 |

EXAMPLES 14–15 AND CONTROL

To a standard PVC pipe formulation containing:

| INGREDIENTS | AMOUNT |
|---|---|
| PVC (Shintech SE 950) | 100.0 |
| KM-334 (impact modifier) | 4.0 phr |
| K-120N (processing aid) | 0.5 phr |
| Calcium carbonate (OMYA UFT) | 10.0 phr |
| Titanium dioxide | 1.0 phr |
| Calcium stearate (SYNPRON 15F) | 1.3 phr |
| Paraffin wax | 1.2 phr |
| Oxidized polyethylene | 0.1 phr |
| Dimethyltin mercaptide of mercaptoethyl tallate (ADVASTAB ® TM-599T) | 0.53 phr | there was added either 2-mercaptoethyl tallate as a Control, 2-mercaptoethyl heptanoate to give a product of this invention (Example 14), or a combination of the two to give another product of this invention (Example 15) as shown in Table V. Each was processed on a dynamic two-roll mill (30F/40R) at 390° F. (187° C.) with chips being taken at one minute intervals. The products of this invention (Examples 14 and 15) had a much more pleasant odor than did the Control during processing on the two-roll mill. The Whiteness Index and total color change (dE) of each are shown in Tables VI and VII, respectively.

TABLE V

| Ester | Amount (phr) (equal % SH) | | |
|---|---|---|---|
| | Control | Ex. 14 | Ex. 15 |
| 2-Mercaptoethyl tallate | 0.43 | — | 0.2 |
| 2-Mercaptoethyl heptanoate | — | 0.23 | 0.12 |

TABLE VI

PVC Color Hold (Whiteness Index) During Processing by Roll Mill @ 390° F.

| Minutes | 1 | 2 | 3 | 4 | 5 | 6 |
|---|---|---|---|---|---|---|
| Control | 60.1 | 50.9 | 41.7 | 28.5 | 13.9 | 0.9 |
| Ex. 14 | 57.6 | 51.2 | 40.6 | 29.8 | 9.1 | −16.5 |
| Ex. 15 | 60.5 | 51.7 | 45.6 | 32.6 | 16.7 | −8.4 |

TABLE VII

PVC Color Hold (dE) During Processing by Two Roll Mill @390° F.

| Minutes | 1 | 2 | 3 | 4 | 5 | 6 |
|---|---|---|---|---|---|---|
| Control | 10.7 | 11.9 | 13.5 | 16.5 | 20.4 | 25.0 |
| Ex. 14 | 10.4 | 11.5 | 13.4 | 16.2 | 21.6 | 29.1 |
| Ex. 15 | 9.6 | 11.2 | 12.4 | 15.2 | 19.5 | 26.7 |

EXAMPLES 16–19 AND COMPARATIVE EXAMPLES 9–11

Three blends of the dimethyltin mercaptide of mercaptoethyl tallate (ADVASTAB® TM-599T) and 2-mercaptoethyl heptanoate (MEH) were made by shaking the components in a 2 ounce bottle for 30 seconds and three blends of the dimethyltin mercaptide of mercaptoethyl tallate (ADVASTAB® TM-599T) and 2-mercaptoethyl tallate (MET) were made in the same way. The strength and character of the odors emanating from the blends were compared by a panel composed of 7 people who did not know the identity of the blends. They were asked to rate the strength of the odors on a scale from 1 to 10 (the strongest) and the character of the odors on a scale wherein the most favorable would be given a rating of 1 and least favorable a rating of 10. The weights of the components and the average ratings are given in Table VIII.

TABLE VIII

| Example | ADVASTAB ® TM-599T | MET | MEH | Strength | Character |
|---------|--------------------|-----|-----|----------|-----------|
| 16      | 28.5               | —   | 1.5 | 5.4      | 5.7       |
| CE 9    | 28.5               | 1.5 | —   | 6.6      | 6.6       |
| 17      | 22.5               | —   | 7.5 | 5.7      | 4.3       |
| CE 10   | 22.5               | 7.5 | —   | 7.1      | 6.9       |
| 18      | 15.0               | —   | 15.0| 5.6      | 4.4       |
| CE 11   | 15.0               | 15.0| —   | 7.9      | 6.9       |

Thus, the 2-mercaptoethyl heptanoate imparts a more pleasing odor from both standpoints to the tin mercaptide than does the corresponding tallate ester at equal concentrations. The unpleasant odor of the blend containing the tallate ester is magnified by its strength whereas the more pleasant odor of the heptanoate is not diminished greatly by its lesser strength.

The subject matter claimed is:

1. A method for imparting a pleasant, pineapple-like fragrance to a process for stabilizing a halogen-containing polymer against thermal decomposition, said method comprising mixing the polymer with a stabilizer selected from the group consisting of
    (a) a stabilizer comprising
        (A) from 50 to 100% of an organotin mercaptide of a mercaptoalkyl carboxylate, on an equivalents basis, wherein said carboxylate is selected from the group consisting of a heptanoate and a mixture of a heptanoate with up to about 80% by weight of a second carboxylate having from 8 to 20 carbon atoms in the carboxylic moiety, and
        (B) from 0 to 50% of the mercaptoalkyl carboxylate of which (a)(A) is the organotin mercaptide, on an equivalents basis, and
        (C) from 0 to 50% of a sulfide of the organotin mercaptide of which (a)(A), on an equivalents basis; and
    (b) a stabilizer comprising
        (A) an organotin mercaptide of a mercaptoalkyl carboxylate having from 14 to 20 carbon atoms in the carboxylic moiety, and
        (B) from about 1% to about 50% of a mercaptoalkyl heptanoate.

2. The method of claim 1 wherein the mercaptoalkyl moiety of (a)(A) is mercaptoethyl.

3. The method of claim 1 wherein the amount of stabilizer component (a)(C) is 0%.

4. The method of claim 1 wherein the stabilizer component (a)(C) is from about 15 to about 50%, on an equivalent basis.

5. The method of claim 1 wherein the carboxylate moiety of (a)(A) is a heptanoate.

6. The method of claim 1 wherein the carboxylate moiety of (a)(A) is a mixture of a heptanoate with from about 20 to about 75% by weight of the mixture of a second carboxylate having from 8 to 20 carbon atoms in the carboxylic moiety.

7. The method of claim 1 wherein the carboxylate moiety of (a)(A) is a mixture of a heptanoate with about 50% by weight of the mixture of a second carboxylate having from 8 to 20 carbon atoms in the carboxylic moiety.

8. The method of claim 6 wherein there are 8 carbon atoms in the carboxylic moiety of the second carboxylate.

9. The method of claim 7 wherein there are 8 carbon atoms in the carboxylic moiety of the second carboxylate.

10. The method of claim 1 wherein there are 8 carbon atoms in the carboxylic moiety of the second carboxylate.

11. The method of claim 4 wherein the carboxylate of (a)(A) is a heptanoate.

12. The method of claim 11 wherein the mercaptoalkyl moiety is mercaptoethyl.

13. The method of claim 4 wherein the carboxylate of (a)(A) is a mixture of a heptanoate with about 20 to about 75% by weight of the mixture of a second carboxylate having from 8 to 20 carbon atoms in the carboxylic moiety.

14. The method of claim 4 wherein the carboxylate of (a)(A) is a mixture of a heptanoate with about 50% by weight of the mixture of a second carboxylate having from 8 to 20 carbon atoms in the carboxylic moiety.

15. The method of claim 1 wherein the amount of stabilizer is from about 0.01 to about 10%, by weight, of the polymer.

16. The method of claim 1 wherein the amount of stabilizer is from about 0.2 to about 5% by weight of the polymer.

17. A method for imparting a pleasant, pineapple-like fragrance to a process for stabilizing a halogen-containing polymer against thermal decomposition, said method comprising mixing the polymer with an organotin stabilizer comprising
    (a) from 50 to 100% on an equivalents basis of an organotin mercaptide of a mercaptoalkyl carboxylate selected from the group consisting of
        (1) a carboxylate having the formula:
            $R_{(4-n)}$—Sn—$[S$—$(CH_2)_m$—$OC(=O)R^1]_n$ wherein the R groups are the same or different alkyl groups having from 1 to 12 carbon atoms;
            $R^1$ is an alkyl radical having 6 carbon atoms; m is 2 or 3, and n is from 2 to 3; and
        (2) a mixture of the carboxylate of (1) and up to about 80% by weight of the mixture of a carboxylate having the formula:
            $R_{(4-n)}$—Sn—$[S$—$(CH_2)_m$—$OC(=O)R^2]_n$ wherein the R groups are the same or different alkyl groups having from 1 to 12 carbon atoms;
            $R^2$ is an alkyl radical having from 7 to 19 carbon atoms; m is 2 or 3, and n is from 2 to 3; and
    from 0 to 50% of the mercaptoalkyl carboxylate with the structure HS—$(CH_2)_m$—$OC(=O)R^1$ wherein m has the same value as in (a)(1), and $R^1$ is the same structure as in (a)(1), on an equivalents basis.

18. The method of claim 1 wherein the stabilizer is stabilizer (a), and wherein the amount of stabilizer component (a)(B) is 0%.

19. The method of claim 1 wherein the stabilizer is stabilizer (b).

* * * * *